United States Patent Office 2,773,086
Patented Dec. 4, 1956

2,773,086

PRODUCTION OF ISOCYANATES FROM SUBSTITUTED UREAS

Robert J. Slocombe, Dayton, Ohio, and James H. Saunders, Anniston, Ala., assignors to Monsanto Chemical Company, St. Louis, Mo., a corporation of Delaware No Drawing. Application January 19, 1953, Serial No. 332,086

13 Claims. (Cl. 260—453)

The present invention is directed to monocarbamyl halides and isocyanic acid esters and to an improved method of producing same.

An object of the invention is to provide an economically and commercially feasible method of making monocarbamyl halides and isocyanic acid esters in good yields.

Another object of the invention is to provide a method of making monocarbamyl halides and isocyanic acid esters from readily available starting materials.

Another object of the invention is to provide a method of making monocarbamyl halides and isocyanic acid esters without the use of phosgene, thus overcoming the disadvantages and difficulties which accompany the use of this toxic gas.

A further object of the invention is to provide a continuous method of producing monocarbamyl halides and isocyanic acid esters from N-monosubstituted or N,N'-disubstituted ureas and hydrogen halides.

Other objects and advantages will be apparent to those skilled in the art as the description of the invention proceeds.

In accordance with the instant invention, the above objects are accomplished by reacting, in the vapor phase, N-monosubstituted or N,N'-disubstituted ureas with hydrogen halides in accordance with the following equations:

(1) $RNH-CONH_2 + HX \rightarrow RNCO + NH_4X$
(2) $RNHCONH_2 + 2HX \rightarrow RNHCOX + NH_4X$
(3) $RNH-CO-NHR' + HX \rightarrow RNCO + R'NH_2HX$
(4) $RNH-CO-NHR' + HX \rightarrow R'NCO + RNH_2HX$
(5) $RNH-CO-NHR' + 2HX \rightarrow$
$RNHCOX + R'NH_2 \cdot HX$
(6) $RNHCOX \rightarrow RNCO + HX$
(7) $RNHCONHR' + 2HX \rightarrow R'NHCOX + RNH_2HX$
(8) $R'NHCOX \rightarrow R'NCO + HX$ wherein R and R' are the same or different organic radicals and X is a halogen atom, preferably chlorine and bromine.

In the above reactions, the product recovered may be the monocarbamyl halide or the corresponding isocyanic acid ester, depending upon the hydrogen halide:urea molar ratio used and upon the method and conditions employed in treating the gaseous or vaporous reaction product. For example, if the molar ratio is 1:1, all of the hydrogen halide combines with the by-product ammonia or amine, leaving only the free isocyanic acid ester. On the other hand, if the molar ratio of hydrogen halide to urea is greater than 1:1 or is at least 2:1, condensation of the gaseous or vaporous product causes the isocyanic acid ester and excess hydrogen halide to combine to form mixtures of the above ester and the corresponding monocarbamyl halide or a product consisting essentially of the carbamyl halide. Moreover, if the hydrogen halide in excess of that required to form ammonium halide or amine hydrohalide is separated from the gaseous or vaporous product at a temperature or under conditions avoiding substantial combination of the ester with the hydrogen halide, then the isocyanic acid ester is recovered. The separation of the isocyanic acid esters from the unreacted hydrogen halide is accomplished by physical and/or chemical means, but the most practical method to be used varies with the isocyanic ester produced.

Thus, if the isocyanic acid ester boils above the decomposition temperature of the corresponding carbamyl halide, the separation may be advantageously effected by chemical or physical means such as by condensing or scrubbing the ester from the reaction products at a temperature above that at which the carbamyl halide dissociates to hydrogen halide and isocyanate. However, if the ester boils in the range of or below the carbamyl halide decomposition temperature, then chemical methods of separation are the more practical ones to use, but it is to be understood that the invention is not limited thereto as physical methods may also be employed. In either event, it is essential to make the separation at a temperature corresponding to or above the decomposition point of the carbamyl halide, otherwise this compound or mixtures thereof with isocyanic acid esters will be formed.

For a more complete understanding of the present invention, reference is made to the following illustrative examples.

EXAMPLE I

*Phenylcarbamyl chloride*

The apparatus employed in this embodiment of the invention included a tubular reactor, a receiver partially filled with toluene, a packed tower mounted on the receiver and communicating therewith and a recycle line including a centrifugal pump for withdrawing toluene from the receiver and pumping it into the top of the packed tower so that the above solvent could scrub the gaseous or vaporous reaction product. The scrubbing solvent thus enriched was then returned to the receiver to be continuously recycled to the scrubbing tower, and the uncondensed gases were discharged from the system by an exhaust gas line which was attached to the top of the above tower.

The tubular reactor consisted of an electrically heated Pyrex glass tube which was 1 inch in diameter and 18 inches in length. About two inches from the feed end of the reactor, there was provided an inlet tube for introducing nitrogen and finely divided N,N'-diphenylurea, and about 5 inches from the same end, the reactor was equipped with an inlet tube for introducing hydrogen chloride so that it could react with the vaporized N,N'-diphenylurea. Moreover, the reactor was provided with a thermometer which extended from the feed end of the reactor to a point just beyond the hydrogen chloride inlet tube so that the reaction temperature could be measured. In addition, in the reactor and beyond the end of the thermometer, Berl saddles were introduced so as to facilitate intimate mixing of the reactants. Finally, the exit end of the reactor was directly connected to the toluene-containing receiver in such a manner that the gaseous or vaporous product was passed over the surface of the toluene and then was conducted into the packed tower where it was treated with a countercurrent stream of the recycled toluene.

Nitrogen under slight pressure was introduced along with the symmetrical disubstituted urea so as to facilitate the mixing of the latter with the hydrogen chloride and also to prevent the hydrogen chloride from flowing in the direction of the disubstituted urea inlet tube which was found to cause side reactions and a substantial reduction in the yield of the desired product.

Description of method

N,N'-diphenylurea (49.5 grams), nitrogen and an excess of hydrogen chloride were introduced into the above reactor over a period of 5 hours, during which time the reaction temperature was maintained within the range of about 350° C. to about 360° C. The effluent gases and solids from the reactor were passed into the scrubbing tower where the phenylcarbamyl chloride, aniline hydrochloride and unreacted N,N'-diphenylurea were recovered by scrubbing with toluene. The gaseous residue including nitrogen and hydrogen chloride was discharged from the system.

The toluene slurry thus produced was filtered to remove its solids content, namely, the aniline hydrochloride and unreacted N,N'-diphenylurea. The resulting filtrate containing phenylcarbamyl chloride was then treated with aniline to convert the latter to N,N'-diphenylurea. 23.6 grams of N,N'-diphenylurea was obtained, thus showing that the yield of phenylcarbamyl chloride corresponded to 57.6% of theory, basis N,N'-diphenylurea.

EXAMPLE II

Phenylcarbamyl chloride

The procedure described in Example I was repeated, using a reaction temperature of about 350° C. to about 370° C., 48.4 grams of N-phenylurea, and an excess of hydrogen chloride gas.

The toluene slurry thus obtained was filtered to remove its solids content which included unreacted N-phenylurea and ammonium chloride. The resulting filtrate was then treated with aniline and carbanilide was obtained in good yield, thus showing that N-phenylurea had been converted into the corresponding carbamyl chloride, i. e., phenylcarbamyl chloride.

EXAMPLE III

Ethylcarbamyl chloride

The procedure employed in Example I was repeated, using 81.5 grams of symmetrical diethylurea, an excess of hydrogen chloride gas, a reaction temperature of about 350° C. to about 360° C., and a reaction time of 4½ hours. The ethylcarbamyl chloride obtained was treated with aniline to form 72.9 grams of N,N'-ethylphenylurea, corresponding to a 63.3% yield of ethylcarbamyl chloride.

EXAMPLE IV

Cyclohexyl isocyanate

The procedure described in Example I was followed, employing 58.7 grams of symmetrical dicyclohexylurea, an excess of hydrogen chloride gas, a reaction temperature of about 350° C. to about 360° C., and a reaction time of 5½ hours.

The toluene solution was filtered, yielding a precipitate of cyclohexylamine hydrochloride and a filtrate containing cyclohexyl carbamyl chloride. This filtrate was distilled under reduced pressure and 23.4 grams of cyclohexyl isocyanate was recovered which amounted to a yield of 71.5% of theory, basis symmetrical dicyclohexylurea.

In the production of monocarbamyl halides and the corresponding isocyanic acid esters in accordance with the present invention, the hydrogen halide and the N-monosubstituted or N,N'-disubstituted urea are reacted together in the vapor phase and in a hydrogen halide/urea molar ratio which may vary from about 1.1 to about 8.0. Larger or smaller ratios are also within the scope of the invention, but when smaller ratios are used, the theoretical requirements for combination with the by-product ammonia or amine should at least be met.

The above reaction is carried out at a temperature within the range defined by the boiling point of the N-monosubstituted or N,N'-disubstituted urea and that temperature which avoids substantial decomposition of the isocyanic acid ester produced. More particularly, the reaction is carried out at a temperature within the range of about 300° C. to about 500° C. and within these limits a temperature of about 350° C. to about 400° C. is preferred.

The product of the reaction between the hydrogen halide and the N-monosubstituted or N,N'-disubstituted urea is a gaseous or vaporous mixture containing the corresponding isocyanic acid ester. If the hydrogen halide is used in an amount exceeding that required to react with the by-product ammonia or amine, the isocyanic acid ester and the excess hydrogen halide react at temperatures below about 60° C. to about 100° C. to produce the corresponding monocarbamyl halide. Therefore, if the isocyanate is desired, it is essential that the excess hydrogen halide be separated from the isocyanate at a temperature at which substantial combination is avoided. Stated in other words, this separation should be effected at a temperature above 90° C. but below the boiling point of the isocyanic acid ester or, preferably, at a temperature above 90° C. but not above about 120° C. However, if the hydrogen halide is employed only in an amount sufficient to react with the by-product ammonia or amine, no excess hydrogen halide will be present in the gaseous or vaporous mixture, in which case the isocyanate will be recovered directly. The mixture of ammonium halide or amine hydrohalide and isocyanate thus obtained is desirably separated by one of the following methods.

One method involves passing the gaseous or vaporous reaction product into a solid entrainment separator, e. g., a cyclone separator operated at a temperature such that the solid ammonium halide or amine hydrohalide is separated and the isocyanate is passed on with the gas stream. This gas stream is further cooled and scrubbed with toluene or another suitable solvent to effect a recovery of the isocyanate.

Another method comprises collecting the ammonium halide or amine hydrohalide and isocyanate in toluene, hexane or another suitable selective solvent for the isocyanate, filtering to remove the ammonium halide or amine hydrohalide and then distilling to separate the isocyanate from the solvent.

The isocyanic acid esters containing from 2 to 5 carbon atoms per mol boil in the range of or below the carbamyl halide decomposition temperature and may be separated from hydrogen halide by scrubbing with a tertiary amine or a solution thereof in an inert organic solvent for the ester such as chlorobenzene, xylene, toluene, orthodichlorobenzene, 1,2,4-trichlorobenzene, kerosene, cyclohexane, carbon tetrachloride, hexahydrobenzene, ligroin, petroleum, etc. The separation of the above esters from the hydrogen halide may also be effected by adsorbing the hydrogen halide in an adsorbent or any of the well-known means for physically separating the above gas from gaseous products containing same.

The isocyanic acid esters containing at least 6 carbon atoms per mol boil above the decomposition temperature of the corresponding carbamyl halide and may be readily separated by condensing and/or scrubbing the esters from the reaction product at a temperature above the decomposition temperature of the corresponding carbamyl halide, but other well-known physical methods of separating hydrogen halide from gases containing same are also within the scope of the invention.

If desired, the hydrogen halide and the N-monosubstituted or N,N'-disubstituted urea may be reacted together in the vapor phase and in the proportions required to form a vaporous or gaseous mixture of isocyanic acid ester, by-product ammonium halide or amine hydrohalide and unreacted hydrogen halide, which product is then permitted to condense so as to recover the corresponding carbamyl halide by chemical union of the ester with the unreacted hydrogen halide. The carbamyl halide may then be converted into the corresponding isocyanate and the method employed for this purpose is dependent upon the relationship between the boiling point of the isocyanate and the decomposition temperature of the carbamyl halide. If the boiling point of the isocyanate is above the decomposition temperature of the carbamyl halide, then the conversion may be carried out thermally without a dehydrohalogenation agent. On the other hand, if the boiling point of the isocyanate is below the decomposition temperature of the carbamyl halide, then a dehydrohalogenation agent is required. In either event, however, a dehydrohalogenation agent may be employed.

Where the monocarbamyl halide is the desired end product, it may be recovered from the gaseous reaction product by any one of the procedures described in Patent No. 2,480,088 to Robert J. Slocombe and Edgar E. Hardy.

The present invention, while illustrated by the above examples, is not limited thereto, but has general application to the preparation of monocarbamyl halides and isocyanic acid esters by reaction of hydrogen halides with N-monosubstituted or N,N'-disubstituted ureas of the formulae, RNH–CONH₂ and RNH–CO–NHR', wherein R and R' are the same or different organic radicals and preferably organic radicals of the class consisting of aryl, aralkyl, alkaryl, alkyl, cycloalkyl and heterocyclic radicals and the substituted derivatives thereof. The substituents contemplated by the instant invention include halogen-, alkoxy-, acyl-, nitro and other radicals which do not react with hydrogen halides or isocyanic acid esters. Typical examples of N-monosubstituted ureas which may be used in the practice of this invention are phenylurea, p-tolylurea, m-chlorophenylurea, α-naphthylurea, ethylurea, butylurea, octylurea, cyclohexylurea, (methylcyclopentyl)urea and p-bromophenylurea, etc. As illustrative examples of N,N'-disubstituted ureas which may be used in which R and R' represent different radicals there may be mentioned chlorophenylbutylurea, phenyltolylurea, tolylxylylurea, phenylcyclohexylurea, phenylbutylurea, cyclohexylbutylurea and propylbutylurea.

The separation of the monocarbamyl halide or the corresponding isocyanic acid ester from the reaction product may be effected in any convenient manner and the invention is not limited to the recovery methods herein specifically described. It is to be understood that various modifications may be practiced without departing from the spirit and scope of the invention as defined in the appended claims.

This application is a continuation-in-part of our co-pending application Serial No. 282,896, filed April 17, 1952, now abandoned.

What we claim is:

1. The method of preparing monocarbamyl chlorides and the corresponding isocyanic acid esters which comprises reacting in the vapor phase hydrogen chloride and a N-substituted urea of the following general formula:

wherein R is a substituent selected from the group consisting of alkyl, cycloalkyl, aryl and halogen derivatives thereof, and R' is a substituent selected from the group consisting of hydrogen, alkyl, cycloalkyl, aryl and halogen derivatives of said radicals, said reaction being carried out at a temperature within the range defined by the boiling point of said N-substituted urea and that temperature avoiding substantial decomposition of the isocyanate, and said reactants being employed in a hydrogen chloride/N-substituted urea molar ratio of from about 1:1 up to substantially in excess of 2:1.

2. The method of preparing monocarbamyl chlorides and the corresponding isocyanic acid esters, which comprises reacting, in the vapor phase and at a temperature within the range of about 300° C. to about 500° C., hydrogen chloride and a disubstituted urea of the following general formula:

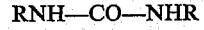

wherein R is a substituent selected from the group consisting of alkyl, cycloalkyl, aryl and halogen derivatives thereof, said reactants being employed in a hydrogen chloride/disubstituted urea molar ratio of from 1:1 to at least 2:1.

3. The method of preparing monocarbamyl chlorides which comprises reacting, in the vapor phase and at a temperature within the range of about 300° C. to about 500° C., hydrogen chloride and a disubstituted urea of the following general formula:

RNH—CO—NHR wherein R is a substituent selected from the group consisting of alkyl, cycloalkyl, aryl and halogen derivatives thereof, to form a vaporous product containing an isocyanate including the radical R and unreacted hydrogen chloride and then condensing said vaporous product to recover the corresponding carbamyl chloride by chemical union of said isocyanate with said unreacted hydrogen chloride, said reactants being employed in a hydrogen chloride/disubstituted urea molar ratio of at least 2:1.

4. The method of preparing isocyanic acid esters, which comprises reacting, in the vapor phase and at a temperature within the range of about 300° C. to about 500° C., hydrogen chloride and a disubstituted urea of the following general formula:

wherein R is a substituent selected from the group consisting of alkyl, cycloalkyl, aryl and halogen derivatives thereof, and then separating the resulting isocyanate from the gaseous product at a temperature avoiding substantial combination of said isocyanate with the unreacted hydrogen chloride.

5. The method of preparing isocyanic acid esters, which comprises reacting in the vapor phase and at a temperature within the range of about 300° C. to about 500° C., hydrogen chloride and a disubstituted urea of the following general formula:

wherein R is a substituent selected from the group consisting of alkyl, cycloalkyl, aryl and halogen derivatives thereof, and then separating the resulting isocyanate from the gaseous reaction product while the latter is maintained at a temperature above 90° C. but below the boiling point of said isocyanate, said reactants being employed in a hydrogen chloride/disubstituted urea molar ratio of about 1:1.

6. The method of preparing phenyl isocyanate, which comprises reacting, in the vapor phase and at a temperature of about 350° C. to about 370° C., hydrogen chloride and N-phenylurea to form a vaporous product containing phenyl isocyanate and unreacted hydrogen chloride and separating said isocyanate from said vaporous product under conditions preventing recombination of said unreacted hydrogen halide with said isocyanate, said reactants being employed in a molar ratio of hydrogen chloride to N-phenylurea which is in excess of that stoichiometrically required to produce said isocyanate.

7. The method of preparing phenyl isocyanate, which comprises reacting, in the vapor phase and at a temperature within the range of about 300° C. to about 500° C., N,N'-diphenylurea and hydrogen chloride to form a vaporous product containing phenyl isocyanate and unreacted hydrogen chloride and then separating said phenyl isocyanate by condensing same from said product at a temperature above that at which substantial combination with said unreacted hydrogen chloride occurs, said reactants being employed in a hydrogen chloride/N,N'-diphenylurea molar ratio of at least 1:1.

8. The method of preparing phenyl isocyanate which comprises reacting, in the vapor phase and at a temperature within the range of about 300° C. to about 500° C., hydrogen chloride and N,N'-diphenylurea to form a vaporous product containing phenyl isocyanate and unreacted hydrogen chloride and then separating said isocyanate by condensing same from said product at a temperature above 125° C., said reactants being employed in a hydrogen chloride/N,N'-diphenylurea molar ratio of at least 1:1.

9. The method of preparing phenyl isocyanate, which comprises reacting, in the vapor phase and at a temperature within the range of about 300° C. to about 500° C., hydrogen chloride and N,N'-diphenylurea to form a vaporous product containing phenyl isocyanate and unreacted hydrogen chloride and scrubbing said isocyanate from said product by means of an inert organic solvent maintained at a temperature above 105° C., said reactants being employed in a hydrogen chloride/N,N'-diphenylurea molar ratio of at least 1:1.

10. The method of preparing phenylcarbamyl chloride, which comprises reacting, in the vapor phase and at a temperature of about 350° C. to about 400° C., hydrogen chloride and N,N'-diphenylurea to form a vaporous product containing phenyl isocyanate and unreacted hydrogen chloride and then condensing the resulting product and thereby recovering phenylcarbamyl chloride which forms on recombination of the phenyl isocyanate with the unreacted hydrogen chloride, said reactants being employed in a hydrogen chloride/N,N'-diphenylurea molar ratio of at least 2:1.

11. The method of preparing phenylcarbamyl chloride, which comprises reacting, in the vapor phase and at a temperature of about 350° C. to about 370° C., hydrogen chloride and N-phenylurea to form a vaporous product containing phenyl isocyanate and unreacted hydrogen chloride and condensing said vaporous product to recover the corresponding carbamyl chloride by chemical union of said phenyl isocyanate with said unreacted hydrogen chloride, said reactants being employed in a hydrogen chloride/N-phenylurea molar ratio of at least 2:1.

12. The method of preparing ethylcarbamyl chloride, which comprises reacting, in the vapor phase and at a temperature of about 350° C. to about 400° C., hydrogen chloride and N,N'-diethylurea to form a vaporous product containing ethyl isocyanate and unreacted hydrogen chloride and then condensing the resulting product to recover ethylcarbamyl chloride by chemical combination of the ethyl isocyanate with said unreacted hydrogen chloride, said reactants being employed in a hydrogen chloride/N,N'-diethylurea molar ratio of at least 2:1.

13. The method of preparing cyclohexyl isocyanate, which comprises reacting, in the vapor phase and at a temperature of about 350° C. to about 400° C., hydrogen chloride and N,N'-dicyclohexylurea to form a vaporous product containing cyclohexyl isocyanate and unreacted hydrogen chloride, condensing said vaporous product and thereby recovering cyclohexyl carbamyl chloride by chemical union of said isocyanate and said unreacted hydrogen chloride and then heating said cyclohexyl carbamyl chloride to convert same into the corresponding isocyanate, said reactants being employed in a hydrogen chloride/N,N'-dicyclohexylurea molar ratio in excess of 1:1.

References Cited in the file of this patent
OTHER REFERENCES

Degering: "An Outline of Organic Nitrogen Compounds" (1945), page 440.